(12) United States Patent
Ferraro

(10) Patent No.: US 7,025,257 B2
(45) Date of Patent: *Apr. 11, 2006

(54) CASH DISPENSING AUTOMATED BANKING MACHINE DISPLAY FAILURE DETECTION SYSTEM AND METHOD

(75) Inventor: Francesco Ferraro, Piverone (IT)

(73) Assignee: Diebold Self-Service Systems a division of Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/921,413

(22) Filed: Aug. 16, 2004

(65) Prior Publication Data

US 2005/0029340 A1    Feb. 10, 2005

Related U.S. Application Data

(62) Division of application No. 10/745,254, filed on Dec. 23, 2003, now Pat. No. 6,966,486.

(60) Provisional application No. 60/436,848, filed on Dec. 26, 2002.

(51) Int. Cl.
*G06F 17/60* (2006.01)

(52) U.S. Cl. ...................................................... 235/379
(58) Field of Classification Search ................ 235/375, 235/379; 705/1, 16, 43
See application file for complete search history.

(56) References Cited

U.S. PATENT DOCUMENTS

| | | | |
|---|---|---|---|
| 4,870,357 A | 9/1989 | Young et al. | |
| 4,897,721 A | 1/1990 | Young et al. | |
| 5,572,444 A | 11/1996 | Lentz et al. | |
| 6,308,887 B1 | 10/2001 | Korman et al. | |

*Primary Examiner*—Michael G. Lee
*Assistant Examiner*—Lisa M. Caputo
(74) *Attorney, Agent, or Firm*—Ralph E. Jocke; Daniel D. Wasil; Walker & Jocke (57) ABSTRACT

An automated banking machine is operative to test a display module thereof. The test determines whether the display module fails to produce an acceptable display output. A predetermined color sequence is sent to the display module for display thereof. A sensor device positioned adjacent the display module screen is operative to sense displayed colors. A machine controller is operative to determine whether the display module displayed the correct color sequence. A display module error signal can be generated responsive to the display module failing to display the proper color sequence. The testing of the display module may continue repeatedly to continually update its display status.

43 Claims, 4 Drawing Sheets

FIG. 7

# CASH DISPENSING AUTOMATED BANKING MACHINE DISPLAY FAILURE DETECTION SYSTEM AND METHOD

CROSS REFERENCE TO RELATED APPLICATION

This application is a divisional of U.S. application Ser. No. 10/745,254 filed Dec. 23, 2003 now U.S. Pat. No. 6,966,486, which claims benefit pursuant to 35 U.S.C. §119(e) of U.S. Provisional Application 60/436,848 filed Dec. 26, 2002.

TECHNICAL FIELD

This invention relates to cash dispensing automated banking machines. Specifically this invention relates to failure detection of an automated banking machine display module.

BACKGROUND ART

Automated banking machines are well known in the prior art. Automated banking machines may include automated teller machines (ATMs) through which consumers may conduct banking transactions. Other types of automated banking machines may include devices which count or deliver cash or other items of value to a consumer, bank teller or other user, as well as point of sale (POS) terminals and other terminals which enable users to carry out transactions of value.

Some types of automated banking machines are used to dispense cash or other items such as tickets, travelers checks, coupons, scrip, wagering slips, vouchers, or other items of value. Some automated banking machines accept deposits in the form of envelopes, checks, cash, or other items. Some automated banking machines can be used for providing credit, making bill payments, or to debit or deposit funds in various accounts.

Automated banking machines typically include a user interface. The interface can be used to provide visual outputs to a user as well as to receive user inputs. A common output device for an interface is a visual display. A display module can be used to provide outputs and other information to a user. In some machines a display module may include a "touch screen" which enables a user to input instructions by bringing a finger adjacent to the screen of the display module. In machines that use a touch screen, the touch screen can serve as both an output device and an input device.

Many different types of displays can be used with regard to automated banking machines. The displays may be the conventional type or the touch screen type. Such machines may also use displays which are liquid crystal (LCD) or flat panel types, as well as CRT types. Monochrome displays can be used in some machines while color displays can be used in others.

DISCLOSURE OF INVENTION

Typically, service personnel are informed of an automated banking machine display failure after a user, such as a customer, notifies their bank. Thus, there exists a need for diagnostic capability to detect image failure of an automated banking machine display. There further exists a need for display diagnostic capability that is reliable, compact, and low in cost. There further exists a need for diagnostic capability that is suitable for use with different types of automated banking machines displays.

It is an aspect of an exemplary form of the present invention to provide visual output device diagnostic capability.

A further aspect of an exemplary form of the present invention is to provide display module diagnostic capability.

A further aspect of an exemplary form of the present invention is to provide an automated banking machine.

A further aspect of an exemplary form of the present invention is to provide an automated banking machine with visual output device diagnostic capability.

A further aspect of an exemplary form of the present invention is to provide an automated banking machine with display module diagnostic capability.

A further aspect of an exemplary form of the present invention is to provide an automated banking machine with display module failure detection.

A further aspect of an exemplary form of the present invention is to provide an automated banking machine with image display capability detection.

A further aspect of an exemplary form of the present invention is to provide an automated banking machine with LCD failure detection.

A further aspect of an exemplary form of the present invention is to provide an automated banking machine with display failure detection that is simple and reliable in construction and operation.

A further aspect of an exemplary form of the present invention is to provide an automated banking machine with display failure detection that is low in cost.

A further aspect of an exemplary form of the present invention to provide a method for detecting automated banking machine display module display capability.

A further aspect of an exemplary form of the present invention is to provide a method for detecting the failure of an automated banking machine display module to display an image.

Further aspects of exemplary forms of the present invention will be made apparent in the following Best Modes for Carrying Out Invention and the appended claims.

The foregoing aspects can be accomplished in an exemplary embodiment of the present invention by an automated banking machine. The automated banking machine can include a display module failure detection arrangement. The display module can include an LCD. The arrangement can detect the capability of an LCD to show images. The arrangement can include a sensor device located adjacent an LCD panel. The sensor device can include a photo sensor device. The photo sensor device is capable of sensing each color in a color sequence which may include a plurality of colors and/or patterns in a visual output area. The visual output area can be a small test area of the LCD panel. A program or subroutine operating in a controller of an automated banking machine can continuously supply signals operative to cause a color sequence or pattern to be displayed in the test area. Circuitry in the failure detection arrangement can be used to compare the colors and/or patterns to be produced in supplied sequence to the colors sensed by the photo sensor device. The circuitry enables the machine to continuously check if an exact color and/or pattern test sequence was actually displayed. That is, the circuitry enables the machine to check for display failure. Thus, a run time diagnostic can keep the LCD status monitored. Display module failure can be determined independent of the automated banking machine display module used.

In an exemplary form of operation of the present invention, an automated banking machine controller or computer runs a program which can repeatedly submit signals to cause the same color sequence (e.g., blue, red, green) to be output in the LCD test area. The photo sensor device senses the sequence colors actually displayed in the test area. The computer is operative to compare the submitted color sequence with the sensed output sequence of colors. If the exact color sequence does not match then a display diagnostic error signal can be generated.

BEST MODES FOR CARRYING OUT INVENTION

Figure 1:
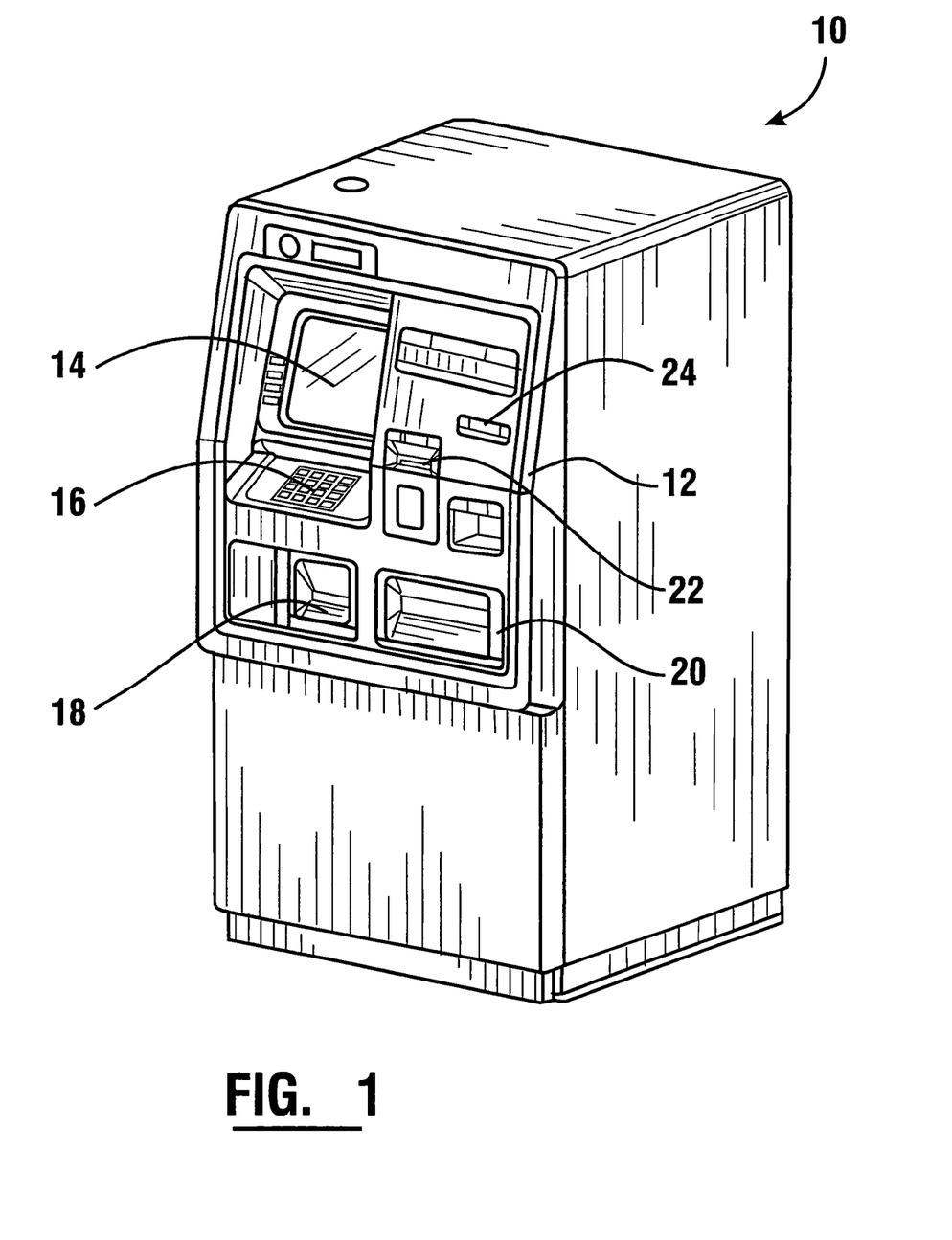
FIG. 1 is an isometric view of an automated banking machine.

Referring now to the drawings and particularly to FIG. 1, there is shown therein an isometric view of an exemplary automated banking machine generally indicated 10. Automated banking machine 10 is an ATM. However, it should be understood that the present invention may be used in other types of automated banking machines, including currency counting units, currency acceptors, currency recyclers, depositories, scrip terminals, POS terminals, and similar type devices.

Automated banking machine 10 includes a fascia 12 which includes a user interface. The fascia includes an opening through which a display screen 14 of a display module may be viewed. A display screen is used for providing outputs such as instructions and messages to users of the machine. The fascia also has thereon a keyboard 16 through which the user may enter instructions.

The fascia also includes openings for other types of devices and mechanisms. In the embodiment shown these include a depository opening 18 into which a user may place deposits. A currency delivery opening 20 is also provided through which currency can be delivered to the user. For example, cash (e.g., currency sheets) may be dispensed from an ATM to a user by a cash dispenser mechanism. The fascia may also include a card entry slot 22 wherein a user can input a debit or credit card which can be used to initiate operation of the ATM. The fascia may also include a receipt delivery opening 24 through which transaction receipts can be delivered to the user.

The exemplary automated banking machine may include numerous transaction function devices and one or more controllers that are operative to cause operation of the devices. An exemplary control system for an ATM is shown in U.S. Pat. No. 6,505,177 the disclosure of which is incorporated herein by reference. Of course this ATM architecture is exemplary and in other embodiments other approaches may be used.

Figure 2:
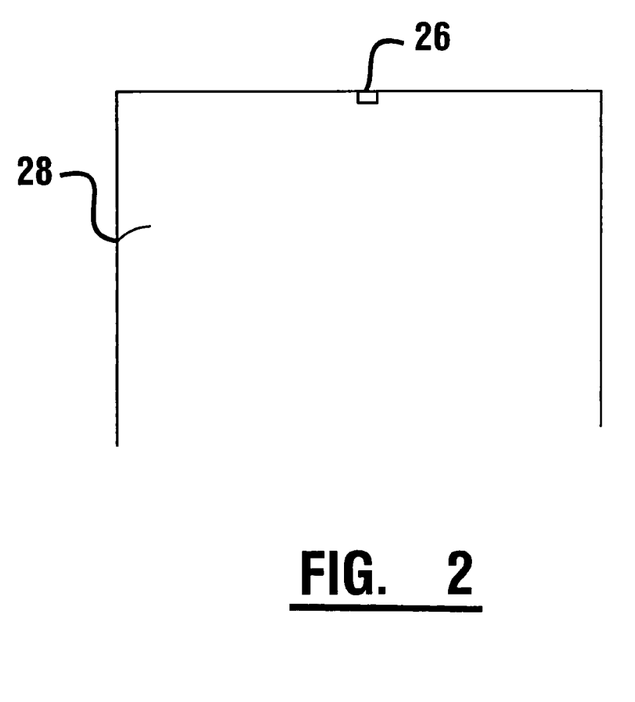
FIG. 2 shows a front view of a display module failure detection arrangement.
Figure 3:
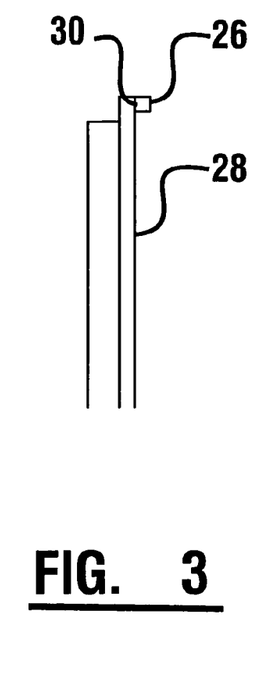
FIG. 3 shows a side view of the arrangement of FIG. 2.

FIG. 2 shows a front view of a display failure detection arrangement having at least one photo sensor device 26 is placed adjacent to a display screen 28, such as an LCD panel. FIG. 3 shows a side view of the arrangement of FIG. 2. An automated banking machine controller is operative to execute a display color diagnostic program. Computer readable media bearing computer executable instructions (e.g., software) can be operative to cause the controller or computer to carry out the diagnostic program. The exemplary programs may reside on or be loaded into memory from media such as a hard disk, CD-ROM, PROM, memory card, floppy disk or other media article.

An exemplary program can operate to cause signals normally operative to cause the same sequence which includes a color pattern or series(e.g., blue, red, green) to be continuously and repeatedly output in a display screen test area 30. Thus, an ATM display module can be continuously tested. The controller can send display instructions or signals to a display module to direct the displaying of a predetermined color pattern or sequence. A sequence can include an arrangement of single colors or an arrangement of plural same colors next to each other. Black/white sequences can be used. For example, a color sequence may include "black, white, black, white" or "red, green, blue" or "red, red, green, blue, blue, blue" or "green, black, red, blue, white, red, white, black." A predetermined color sequence may also include a certain number of first color type (e.g., two red) followed by a certain number of a second color type (e.g., three green). A pattern of plural same colors followed by plural other colors can be used. For example, a sequence may include a plurality of same first type colors (e.g., four blue) followed by a plurality of same second type colors (e.g., two red) followed by a plurality of same third type colors (e.g., three green). Of course this is exemplary and in other embodiments other colors and patterns may be produced.

The photo sensor device 26 may be of the type which is operative to sense colors which have been displayed in the screen test area 30 of the LCD. The photo sensor device may include a photo diode. The photo sensor device may be arranged to sense colors individually or plurally. That is, the photo sensor device may be operative to return a plurality of single colors or a single (or plural) pattern of plural colors to the ATM controller. The photo sensor device may be arranged to sense hues or properties of light by which a color is classified in reference to a spectrum. In some embodiments the sensor may be operative to sense colors and/or patterns that are output at separate times or simultaneously.

Figure 4:
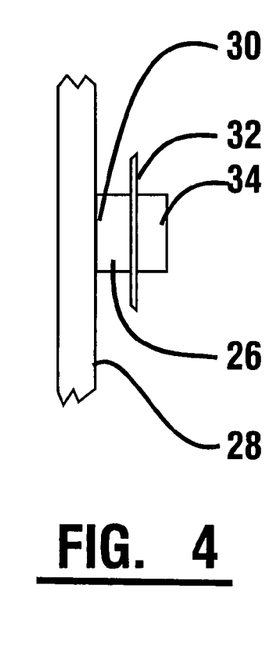
FIG. 4 shows a view of a display module failure detection arrangement including a circuit card.

The photo sensor device can be of a size which corresponds to the size of the test area. For example, the photo sensor device may be of a size which permits sensing of a test color pattern the size of the test area. The test area can be a small area relative to the total LCD area. In an exemplary embodiment of the present invention the test area can be a 4×4 mm square area. Of course detection may be used with test areas of smaller or larger size. The photo sensor device 26 can be part of a circuit card 32, e.g., LCD failure detection circuit card, as shown in FIG. 4. The photo sensor device 26 can also include more than one photo sensor or other type sensing device. A sensor device can be located exterior of a display screen test area. That is, a sensor device can be positioned intermediate a display screen and an outside user area. A sensor device can also be disposed from or in contacting relationship with a display screen. In some exemplary embodiments one or more sensors may be positioned in an area of the ATM fascia adjacent an opening for the screen on the user interface. This enables the sensor to be positioned in underlying relation of the fascia so that the sensor is not subject to tampering or contamination. In other embodiments the one or more sensors may be positioned intermediate of the outer surface containing the liquid crystal or other display material, and an outer transparent surface through which an ATM user views the display. In still other alternative embodiments one or more sensors may be embedded in the transparent members through which a user views the indicia output by the display.

Other approaches may be used in other embodiments. For example in some embodiments one or more light directing devices such as mirror surfaces may be positioned in or adjacent to the line of sight for the display. Such mirror surfaces may be used to direct light in the test area to one or more sensors positioned outside the line of sight of the user. In some embodiments a partially silvered mirror surface may be employed so that the test area of the display from which light is detected may still be viewed by a user. In other embodiments, fiber optic strands or other light guides may be used to direct light from the display to one or more sensors. Of course in other embodiments other light directing devices or light guides may be used. In still other embodiments multiple disposed sensors and/or test areas may be used. For example, in some embodiments the display may be comprised of one or more back lights which serve as a light source positioned behind the display, and one or more layers of liquid crystal or other material may be positioned in the display between the light source and the user. In such embodiments, sensors may be positioned adjacent to one or more components so that sensing is conducted to determine if a particular component is operating properly. For example, a sensor may be positioned adjacent to the light source so as to sense light directly therefrom. Such a sensor may be usable to determine that a light source failure has occurred, rather than a failure of a component of the display overlying the light source. Alternatively or in addition, sensors may be positioned within or adjacent to specific layers of material that produce various aspects of the display output such as each color component. This may enable sensing each of the component layers for operability independently.

In some alternative embodiments multiple disposed test areas may be used. For example, multiple test outputs may be sequentially or simultaneously produced in disposed areas of the display and sensed by appropriate sensors. This may include for example, producing test outputs in disposed areas along one side of a display, or on different sides, adjacent the corners of the display or in other suitable areas. In other alternative embodiments, test areas may be sensed in areas more central to the display. This may be done for example through the use of small embedded fiber optic strands that conduct output light from an area of the display within the line of sight to one or more remote sensors outside the user's line of sight. Such testing may have the advantage that it enables testing for outputs in more central areas of the display and/or in more areas. Testing in some embodiments may be made inconspicuous such as by outputting and sensing test sequences including colors and/or patterns when the ATM is not in use. Alternatively or in addition, one or more controllers may be programmed to run the test sequence at certain times during machine operation so that the test sequence is not likely to be noticed by a user. Alternatively in some embodiments which include a touch screen, the controller may be programmed to output and sense the test sequence in the area of the display that underlies a user's finger when the user is sensed as touching the exterior surface of the touch screen. Of course these approaches are exemplary, and in other embodiments other approaches may be used.

In an exemplary embodiment the controller is operative to compare the submitted color sequence with the sensed output sequence of colors. For example, the first color in the known sequence can be compared with the first color in the sensed sequence. This comparison can be continued for all of the individual color entries in the color sequence. Alternatively, the controller may be arranged to simultaneously compare a number of colors, e.g., all of the colors in the color sequence. The controller may also be operative to receive individual sensed colors from the photo sensor or other sensor device, then arrange the received color information into a complete color sequence prior to simultaneous comparison of the entire two sequences. Thus, individual colors, partial color sequences, or complete color sequences may be compared.

If a known submitted color (or a color sequence) does not exactly match a corresponding sensed display color (or a color sequence), then a display diagnostic error can be generated. That is, if not every submitted color matches a corresponding displayed color in the ordered sequence of colors, then the controller is operative to generate an appropriate error message or other signal.

The display color diagnostic program is implemented and executed by one or more controllers to continuously check the display for failure to produce a proper color. The failure may be the result of the display to produce proper images or any display. Thus, the failure of an ATM LCD can be detected and service personnel (e.g., at a service center) can be informed of the failure. This may be done in some embodiments in the manner shown in U.S. Pat. No. 5,984,178, the disclosure of which is incorporated herein by reference.

The display color diagnostic arrangement may be used to detect failures in LCD functions such as red, blue, green fundamental colors (e.g., with the three most significant bits); pixel clock; vertical sync; horizontal sync; and DE.

The ATM can also include a dimmer sensor 34 operative to sense the level of ambient light shining on the display screen. The dimmer sensor is preferably placed close to the screen to more accurately sense the level of ambient light associated with the display screen. Too much or too little ambient light (and at an undesirable angle) can make it difficult for a user of the machine to read the output of the display screen. For example, a high (bright) level of light may cause screen glare. In an exemplary embodiment the ATM controller is operative to receive signals indicative of the measured amount of ambient light from the dimmer sensor and compare it to an acceptable range. The ATM controller may be operative to adjust the display brightness and/or contrast to compensate for an unacceptable level of light sensed by the ambient light sensor. This may be done for example by adjusting the output of back lighting, the properties of the material in the display for passing or reflecting light and other programmed parameters. Thus, the ATM is operative to maintain a display output which is readable to a user of the ATM.

In an exemplary embodiment the same display failure detection circuit card which includes a photo sensor can also include one or more additional sensors, such as a dimmer (ambient light) sensor 34. FIG. 4 shows a view (top or side) of an arrangement including a photo sensor device 26, display screen 28, screen test area 30, circuit card 32, and dimmer sensor 34. As shown, a photo sensor can be located on a circuit card adjacent to and/or opposite a dimmer sensor. That is, a photo sensor can be on one side of the card facing the display screen and a dimmer sensor can be on an opposite side of the card facing away from the display screen. Thus, both the photo sensor and the dimmer sensor can be positioned adjacent the same common screen test area. Of course more than one of the same sensor type or different types of sensors may be used. The sensors can also be adjacent to a display screen at a location not accessible to a user of the machine. For example, a screen test area may be generally hidden from the view of ATM users by fascia structure.

The photo sensor device 26 may also be of the type which is operative to sense the brightness (light level) output of an LCD. The ATM can be operative to use a brightness sequence in a manner similar to the use of a color sequence. The photo sensor may be operative to sense the brightness of a displayed test output sequence (e.g., black, black, white, black) in a screen test area. The ATM can also be operative to compare the sensed brightness sequence in a manner similar to the comparison of the sensed color sequence to determine if the display module is functioning properly. A comparison can be made of the sensed display brightness output, with a stored acceptable display brightness level or range. For example, the sensed brightness of one or more outputs in the displayed sequence can be compared through operation of one or more controllers with the corresponding or ordered one or more submitted brightness outputs from the stored sequence. The ATM controller may also be operative to compare the brightness pattern of an entire displayed sequence with the known brightness pattern of the entire stored sequence. For example, in the sequence "black, black, white, black, white, black" the first sensed output "black" can be compared with the first submitted "black," which has a known brightness (or darkness) level. If the first sensed "black" falls within an acceptable range of the first submitted "black" then the second sensed output "black" can be compared for acceptability. The sequence comparison can continue until completion. That is, in this example, until each of the four "black" and two "white" have been compared to their corresponding standard. The sequence comparison can be repeated continuously or conducted periodically. Furthermore, different degrees or shades of "black" and/or "white" may be used, e.g., grays. Colors different than black and white may also be used (e.g., blue, red, green). Still, other embodiments may compare the total amount of brightness sensed in a display sequence with the total amount of sequence brightness submitted for display. That is, a combined amount of sensed light may be compared to the combined amount of light submitted for display. A determined brightness output level outside of an acceptable range can result in the diagnostic program generating a display module diagnostic error. Thus, a run time diagnostic can keep an ATM display status continually monitored.

One or more sensors (e.g., photo sensor device) may also be used to check lamp or back light efficiency. Also, the same sensor (or sensors) used for display module (e.g., LCD) failure detection can also be used in lamp efficiency checking. A controller or computer may be programmed to execute a diagnostic program to automatically check the brightness value of one or more back light lamps. Checking can be carried out continually or on a predetermined frequency. For example, the diagnostic program may perform a back light efficiency check once a week (i.e., once every seven days) using a photo sensor device at an ATM. A check can be performed with the lamps at maximum brightness. This may involve changing (e.g., raising) the current brightness level of an LCD screen. An unacceptable maximum lamp brightness level can be programmed at a fixed level or as a predetermined percentage of the initial (or expected) maximum lamp brightness level. For example, it may be time to change a lamp when its measured maximum brightness level is 50% or less of the initial maximum brightness level. That is, a 50% or more reduction in maximum brightness may be the level predetermined as the end of lamp life. Of course other brightness levels (maximum or not maximum) or percentages may be used in determining an end of life for one or more lamps. Additionally, some lamps in the same machine may have different end of life brightness levels. One or more controllers in the ATM may be programmed to cause the machine to test this aspect of display operation and to determine based on the outputs sensed whether there is a problem. Upon or responsive to a determination of an inefficient, unacceptable, defective, or failed lamp, a servicing request signal can be initiated, such as by the controller or a computer. The signal (which may be associated with one or more particular lamps) may be sent to a service center. Thus, a machine having need of lamp (or module) replacement can have the necessary authorities, such as service personnel, automatically notified or advised. Additionally, if an ATM is determined as having a back lighting brightness (or a display) unacceptable for proper customer usage of the ATM, then the machine may be automatically taken out of service or shutdown.

An exemplary embodiment employing certain aspects of the present invention permits certain existing ATMs to be retrofitted to include the display failure detection. That is, an existing ATM may be modified to include programming of one or more controllers which execute a display diagnostic program in association with one or more photo sensors adjacent a display screen test area. An ATM's diagnostic application can also be modified to link with a display diagnostic arrangement for generation of diagnostic errors and record keeping in one or more data stores associated with one or more controllers.

In an exemplary form of operation, an automated banking machine controller, which may be alternatively referred to as a computer, runs a program which can repeatedly submit signals which would normally cause output of the same color sequence in a display screen test area. The photo sensor device senses the colors of the color sequence which were actually displayed in the test area. The exemplary photo sensor device can sense individually displayed colors. For example, after a first sequence color (e.g., blue) is displayed, the sensor device can sense the first color (e.g., blue) being displayed. The sensor device can then detect the next sequence color displayed (which may be a color out of the sequence order). The photo sensor device is operative to cause signals corresponding to the sensed information to be delivered to the controller. Alternatively, the sensed information can be first stored in memory prior to transfer to the controller for comparison or analysis. For example, sensed data may be stored in a data store until an entire sequence (e.g., ten individual colors) has been attempted to be output through the display. The computer and/or program is operative to compare the attempted submitted color sequence (which can correspond to a known standard color sequence) with the actual sensed color sequence. If the compared color sequences do not match or otherwise exhibit a proper relationship, then a display diagnostic error can be generated. Alternatively or in addition, one or more controllers may be programmed to analyze the data to determine the nature of the failure. This may be useful for purposes of remedial service. For example, the controller can deliver information indicating back light failure, particular display component failures or other useful service information. Thus, one or more fault messages can be generated responsive to a malfunctioning display module. Furthermore, in some embodiments a display module can be continuously tested for rapid notification of when a malfunction has occurred. This ability can increase the availability or uptime of an ATM.

Figure 5:
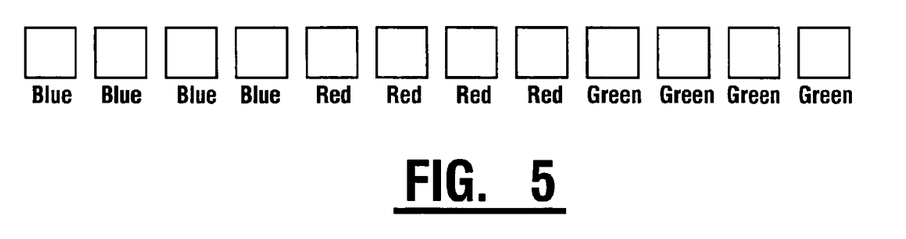
FIG. 5 shows an exemplary form of a test color sequence.

In an operative example, a repeating test color sequence may consist of "blue, blue, blue, blue, red, red, red, red, green, green, green, green," presented in a rectangular pattern as shown in FIG. 5. In the example, a photo sensor device includes at least one photo sensor which can sense at least the colors "blue," "red," and "green." It should be understood that in this embodiment the rectangular pattern of color is output in the same position on the display in different hues at different times. The program may be configured so that individual colors are compared. That is, the first sensed output of the sequence can be compared with a standard for "blue." If the first sensed output is determined to be within the acceptable range of "blue" then the program moves on to compare the second sensed output. If the second sensed output is also determined to be within the acceptable range of "blue" then the program can continue to compare the next sensed output, etc. The acceptable range of "blue" for the first submitted "blue" may differ than the acceptable range of "blue" for the second submitted "blue." That is, the first and second colors in the color sequence may be different tones of blue. Likewise, other colors may be of different tones or hues. Of course in some embodiments all blues (and reds and greens) may be identical. If the first sensed output of the color sequence falls outside an acceptable level or range of the first submitted "blue" then the ATM is operative to generate a display diagnostic error signal.

Alternatively, the comparison arrangement may involve simultaneously comparing a sensed pattern of colors to the known color sequence. For example, the individually sensed colors could be temporarily stored until the sensing of the entire sequence is completed, then the entire sensed sequence can be compared to the known color sequence. The comparison may be of the individual sequence entries or the comparison may be of plural sequence entries. That is, the comparison may involve simultaneously comparing all of the entire sensed color sequence with the known color sequence.

The color sequence comparison may occur in a diagnostic application associated with testing the operability of one or more photo sensors. The color sequence set submitted for repeating display can be separate from (or identical to) the color sequence set used for comparison for testing proper operation of the display. The diagnostic application can compare the sensed color sequence for a match of the known color sequence. The computer may be programmed to identify one or more sensor problems, and may be operative to generate signals indicative thereof.

A timing mechanism may be used to correspond sequence submission with sequence sensing. Alternatively, a photo sensor device can be initiated to sense a numbered pattern of colors without regard to a corresponding time. For example, if the color sequence "blue, blue, blue, blue, red, red, red, red, green, green, green, green" is used, then there are twelve color entries or placement orders in the sequence. The photo sensor device can be operated to sense a pattern of twelve consecutive colors. The pattern does not have to start with blue. The pattern can start at any of twelve entry points in the color sequence. That is, the ATM can view the known color sequence as a continuous loop. An ATM computer can be operative to use pattern recognition to determine whether the sensed color pattern matches the known color sequence. That is, the ATM can be operative to recognize that the sensed display pattern "red, green, green, green, green, blue, blue, blue, blue, red, red, red" is a correct sequence match, and the display module is operating properly.

The testing of the display module may continue repeatedly to continually update its display status. Thus, the display status may be known in real time. Alternatively, testing may be done at other times, such as periodically on a timed basis and/or in relation to transaction activity conducted at the ATM.

Figure 6:
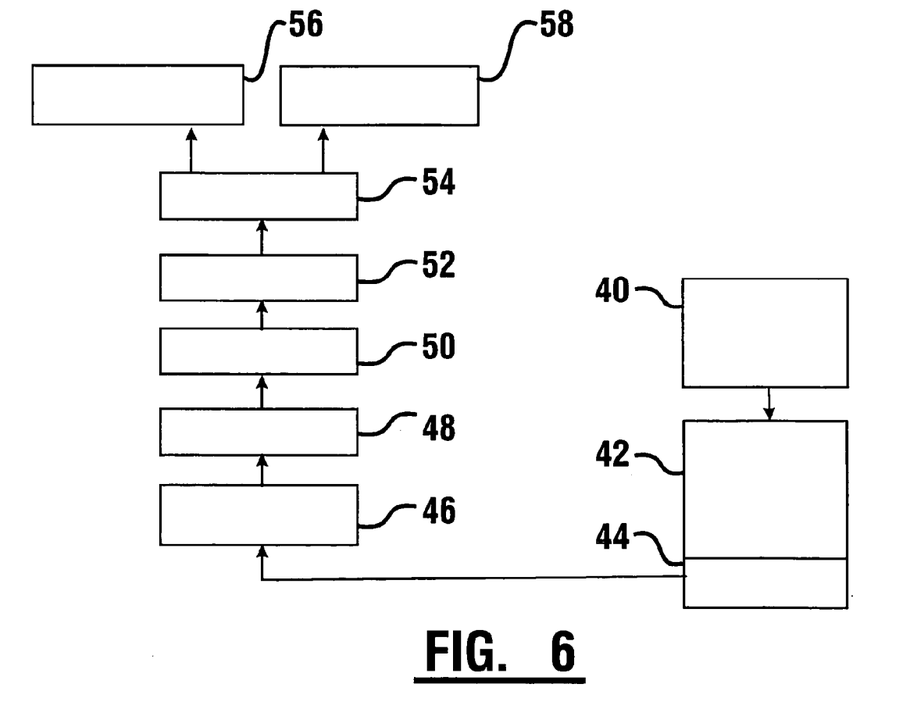
FIG. 6 shows a block diagram of an exemplary form of interrelated modules associated with a display screen diagnostic operation.

FIG. 6 shows a block diagram of interrelated hardware and/or software modules in an example of a display screen diagnostic operation. A test sequence is output from module 40 to the display module 42. A video card including a controller may be used to output a test color sequence, for example. The display module can be an ATM display module. One or more sensors 44 adjacent the display screen can detect each displayed color. Sensor data can be sent to a number of other hardware or software modules, such as modules related to HW fault detection 46, USB stack 48, USB device driver 50, I/O handler 52, and a DLL associated with managing module interfaces 54. Failure results can be managed by a machine wide diagnostic software application 56. The failure results can also be logged into a logging software application 58.

Figure 7:
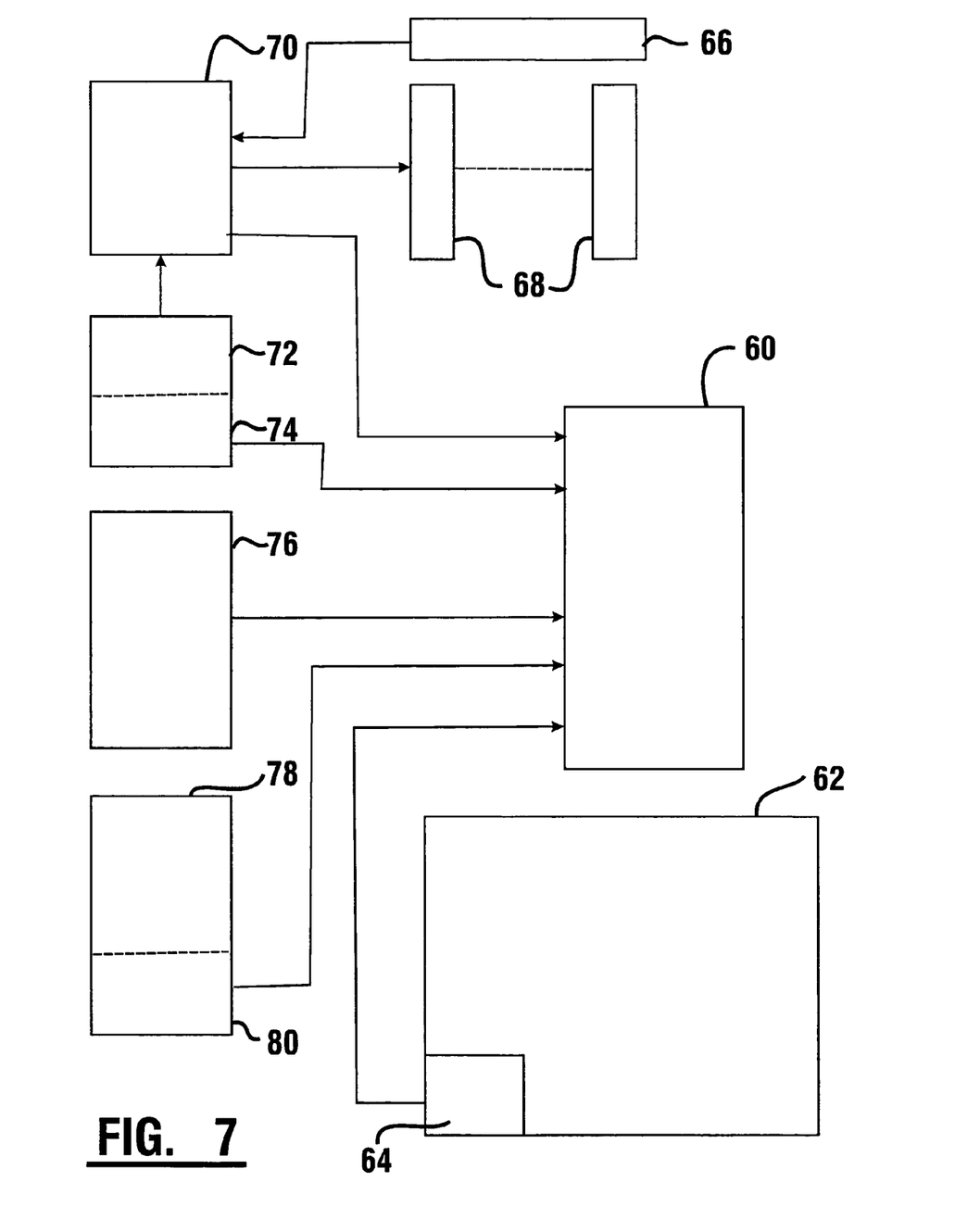
FIG. 7 shows a block diagram of an exemplary form of a component arrangement associated with display module monitoring.

FIG. 7 shows a block diagram of a component arrangement example for display module monitoring. As shown, the functionality of the display screen may be only one of many display module features which are monitored. A controller represented as CPU 60 can be used to coordinate and control monitoring of a display module. The CPU may provide for communication therewith via USB. As previously described, a display screen 62 can have one or more sensors, such as a photo sensor 64 (e.g., photo diode) adjacent one or more test areas thereof. The photo sensor is able to distinguish a specific color from a range of different colors (including no color) which may be displayed in the test area.

Light sensors 66, which may include one or more dimmer sensors, are each operative to sense a level of light. Certain light sensors (e.g., a dimmer sensor) can be associated with the display screen 62 while other sensors can be associated with determining whether specific ATM lamps 68 (i.e., lamp no. 1 to lamp no. 12) are properly operating (e.g., emitting sufficient light). The light sensor data can proceed to an inverter 70 prior to entering the CPU 60. A DC/DC converter 72 and/or a VDC (video display control) monitor 74 may also be used. The VDC monitor can assist in establishing proper display module settings for optimum viewability.

The CPU 60 may also be operatively connected with a DVI receiver 76. The receiver 76 may be operative to enable viewing of video out from the CPU. A fan sub module 78 and a temperature sensor 80 are also shown. Operation of a display module fan can be responsive to the inner environment of a display module reaching a predetermined temperature. Thus, the component arrangement of FIG. 7 can provide for the monitoring and control of an ATM display module.

As described herein, an automated banking machine is operative to test a display module for display failure. The testing can determine whether the display module fails to produce an acceptable display output. A predetermined color sequence can be sent to the display module. A sensor device positioned adjacent the display module screen can be operative to sense displayed colors. A machine controller can determine whether the display module actually displayed the color sequence based on the signals sent. A display module error signal can be generated by the controller responsive to the display module failing to display the proper color sequence. The testing of the display module may continue repeatedly and/or automatically to continually update its display status.

It should be understood that although the exemplary embodiments have been described with reference to a sequence comprising a plurality of colors output in a rectangular pattern within a test area, other sequences which include other patterns may be used in alternative embodiments. These may include pattern designs of varying geometric shapes and color patterns or orders of presentation. Such geometric shapes and colors may be sensed, recognized and analyzed as part of a sequence. Alternatively or in addition, sequences may include changing or moving patterns which can be sensed and analyzed through one or more controllers. Of course these approaches are exemplary, and in other embodiments other approaches may be used.

In some exemplary embodiments of ATMs, the principles described herein may be used for purposes of not only testing display functions but also other ATM functions. For example, in some embodiments the ATM may incorporate certain types of transaction function devices that are not totally dependent on the ATM for operational capability. Such a device might include, for example, a module or subsystem that is operative to cause a user to be credited with value in a remote utility account, such as an account that is used to pay for phone service at a phone company. The ATM may be configured to enable users to transfer value into such accounts. The ATM may be configured so that when the subsystem that provides this function is operational, such as, for example, able to communicate with one or more remote systems to carry out its intended function, a sequence is output in a test area of the screen. Detection and analysis of the sequence can be used to verify that the subsystem is operational. Variations in the sequence may also be used in some embodiments to indicate operational status conditions or properties of the subsystem. In some embodiments aspects of the sequence may be responsive to the remote system such as discontinuing or otherwise changing the sequence responsive to remote system status. One or more controllers in the ATM may be operative to monitor and analyze the sequence, and adjust or control operational properties of the ATM in response thereto, such as not offering the related transactions when the subsystem is not available.

Alternatively the principles described herein may be used in some embodiments to indicate the operational characteristics of devices or software functions of the ATM in addition to the display. For example in some ATM embodiments, such as some described in the incorporated disclosure, screen display data may be based on programs that are operationally distinct from the programs that directly cause operation of ATM transaction function devices. Alternatively, some ATM software configurations may include application software that is provided by an entity other than the entity that manufactured the ATM. In such embodiments the ATM controller may be programmed to monitor the status of one or more devices and to produce as a result thereof one or more sequences on the one or more test areas or windows of the display that is not controlled by the application. In some embodiments the test sequence may be indicative of device status data as well as the colors or patterns that test operability of the display. By monitoring the output sequence in the one or more test areas and feeding back the sensed information to one or more controllers, the ATM is enabled to monitor the operational status of one or more transaction function devices as well as the display. This may enable detection of problems prior to the occurrence of any failed transactions, such as a cash dispensing transaction. Alternatively or in addition, in some embodiments such features may be used to verify that certain transaction function devices, or subsystems are functioning properly, and that if problems occur that they reside with hardware or software other than that which is associated with the output sequence. This could include, for example, a problem with the application software. Of course this approach is exemplary of many that may be used.

Thus the exemplary display module failure detection system and method can achieve one or more of the above-stated objectives, eliminate difficulties encountered in the use of prior devices and systems, solve problems, and attain the desirable results described herein.

In the foregoing description certain terms have been used for brevity, clarity and understanding. However, no unnecessary limitations are to be implied therefrom because such terms are for descriptive purposes and are intended to be broadly construed. Moreover, the descriptions and illustrations herein are by way of examples and the invention in not limited to the details shown or described.

In the following claims any feature described as a means for performing a function shall be construed as encompassing any means capable of performing the recited function, and shall not be deemed limited to the means shown or described herein for performing the recited function or mere equivalents thereof.

Having described the features, discoveries and principles of the invention, the manner in which it is constructed and operated and the advantages and useful results attained; the new and useful structures, devices, elements, arrangements, parts, combinations, systems, equipment, operations, methods and relationships are set forth in the appended claims.

I claim:

1. A method of monitoring a display module of an automated banking machine, wherein the machine includes a currency dispenser mechanism in operative connection with at least one controller, wherein the currency dispenser mechanism is operative to dispense currency from the machine to a user of the machine, including:
 (a) instructing the display module to display a predetermined sequence including a plurality of colors,
 (b) determining whether the display module displayed the sequence,
 (c) generating a display module error signal through operation of the at least one controller responsive to a negative determination in (b).

2. The method according to claim 1 wherein (b) includes sensing outputs displayed through the display module.

3. The method according to claim 2 wherein (b) further includes comparing the sensed outputs to at least a portion of the sequence.

4. The method according to claim 1 and further including
 (d) repeating steps (a)–(c) responsive to a positive determination in (b).

5. The method according to claim 4 wherein (a) includes repeatedly instructing the display module to display the same predetermined sequence.

6. The method according to claim 5 and further including
 (e) repeating steps (a)–(d).

7. A method of determining failure in a display module of an automated banking machine, including:
 (a) instructing an automated banking machine display module to output a predetermined ordered sequence including a plurality of colors, (b) sensing outputs displayed through the display module, (c) operating at least one controller associated with the automated banking machine to compare an order of the sensed outputs with the sequence for order correspondence, (d) generating a display module failure signal responsive to the order of the sensed outputs not corresponding to the sequence.

8. The method according to claim 7 and further including (e) repeating steps (a)–(d) responsive to the order of the sensed outputs corresponding to the sequence.

9. The method according to claim 7 wherein (a) includes instructing the display module to repeat displaying the same sequence.

10. The method according to claim 7 wherein the display module includes a display screen having a display screen area, wherein the display screen area includes display screen test area, wherein the display screen test area is of a size less than the display screen area wherein (a) includes instructing the display module to display the sequence in the display screen test area.

11. The method according to claim 7 wherein (a) includes instructing the display module to display a predetermined hue sequence including at least three different colors.

12. The method according to claim 11 wherein (a) includes instructing the display module to display a predetermined hue sequence including the colors blue, red, and green.

13. A method of monitoring a display module of an automated banking machine including a cash dispenser, comprising:

(a) instructing the display module to display a predetermined pattern, (b) determining through operation of the machine if the pattern was not displayed.

14. The method according to claim 13 and further including (c) generating a display module error signal through operation of the machine responsive to a determination that the pattern was not displayed.

15. The method according to claim 13 wherein (a) includes instructing the display module to display a predetermined multiple color sequence.

16. The method according to claim 15 wherein (a) includes instructing the display module to display a predetermined multiple color sequence including a plurality of same first type colors followed by a plurality of same second type colors.

17. The method according to claim 16 wherein (a) includes instructing the display module to display a predetermined multiple color sequence including a plurality of same first type colors followed by a plurality of same second type colors followed by a plurality of same third type colors.

18. The method according to claim 15 wherein (a) includes instructing the display module to display a predetermined color sequence including colors other than black and white.

19. The method according to claim 18 wherein (a) includes instructing the display module to display a predetermined color sequence including the colors blue, red, and green.

20. The method according to claim 15 wherein (a) includes instructing the display module to display a predetermined hue sequence.

21. The method according to claim 15 wherein (a) includes instructing the display module to display a predetermined color sequence consisting of black and white.

22. The method according to claim 13 wherein (a) includes instructing the display module to display a predetermined brightness sequence.

23. The method according to claim 13 wherein (a) includes instructing the display module to display a predetermined sequence including a plurality of different colors of light.

24. Computer readable media bearing instructions operative to cause a computer to carry out the method steps recited in claim 13.

25. The method according to claim 13 wherein in (a) the pattern comprises a changing pattern.

26. The method according to claim 13 wherein in (a) the pattern is displayed in an area underlying a fascia of the machine.

27. The method according to claim 13 wherein (a) includes instructing the output of at least one sequence which includes the pattern.

28. The method according to claim 27 wherein in (a) the at least one sequence includes outputting at least three colors.

29. The method according to claim 28 wherein (a) includes instructing the output of the at least one sequence in at least one test area of the display module and wherein (b) includes sensing display outputs in the test area with at least one display sensor.

30. The method according to claim 29 wherein (a) includes instructing the output of the at least one sequence in a plurality of disposed test areas and (b) includes sensing the display outputs in the plurality of test areas.

31. The method according to claim 29, wherein the display module comprises a touch screen, and further comprising:

touching the touch screen with a finger, wherein in (a) the at least one test area underlies the finger.

32. The method according to claim 29 wherein the display module comprises at least one light source providing backlighting, and further comprising:

(c) changing the output of the at least one light source responsive to at least one controller in the machine.

33. The method according to claim 32 and further comprising:

(d) sensing ambient light through operation of an ambient light sensor;

wherein the output in (c) is changed responsive to ambient light sensed in (d).

34. The method according to claim 33 wherein in (d) the ambient light sensor is positioned adjacent at least one display sensor.

35. The method according to claim 32 wherein (c) includes instructing the at least one light source to output a level of light, and further comprising (d) sensing with the at least one display sensor the light output during at least a portion of (c);

(e) analyzing the sensed level in (d) through operation of at least one controller in the machine to determine if the at least one light source exhibits a malfunction.

36. The method according to claim 35 and further comprising:

responsive to determination in (e) that at least one light source exhibits a malfunction, operating at least one controller in the machine to send at least one message.

37. The method according to claim 29 wherein the machine comprises a plurality of transaction function devices, and wherein in (a) the sequence is determined responsive to a status associated with at least one transaction function device other than the display module.

38. The method according to claim 37 wherein in (a) the sequence is determined responsive to communication with at least one remote system.

39. A method comprising:
(a) operating at least one controller in an automated banking machine to instruct a display device of a user interface of the machine to produce at least one output, wherein the display device includes a display screen, wherein the automated banking machine includes a cash dispenser and at least one light source adapted to illuminate the display screen;
(b) sensing a level of ambient light shining on the display screen with at least one sensor device;
(c) operating the at least one controller to determine whether the sensed level of ambient light is acceptable;
(d) responsive to a determination in step (c) of an unacceptable level of ambient light, operating the at least one controller to adjust intensity of the at least one light source.

40. The method according to claim 39 wherein in (a) the at least one output comprises a sequence including a plurality of colors, and further comprising
(e) sensing display outputs in at least one test area of the display screen with at least one display sensor;
(f) analyzing the display outputs sensed in step (e) through operation of the at least one controller to determine if the display is functioning properly.

41. The method according to claim 40 wherein the at least one output comprises at least one pattern of ordered colors.

42. The method according to claim 40 wherein the at least one controller is operative to execute at least one software application to produce outputs through the display device, wherein in (e) the at least one test area does not include outputs produced responsive to the at least one application.

43. The method according to claim 40 wherein in (a) the controller is operative to cause the display device to emit a level of light through the display screen, and further comprising
(e) operating the at least one controller to determine whether a sufficient level of light was emitting through the display screen;
(f) responsive to a negative determination in (e), determining that at least one source of light associated with the display device requires replacement.

* * * * *